July 14, 1942.   W. C. HERMAN   2,289,965
SECURING MEANS
Filed Oct. 21, 1939

INVENTOR
WALLACE C. HERMAN
BY
HIS ATTORNEY

Patented July 14, 1942

2,289,965

UNITED STATES PATENT OFFICE 2,289,965

SECURING MEANS

Wallace C. Herman, Oakwood, Ohio

Application October 21, 1939, Serial No. 300,532

8 Claims. (Cl. 74—230.17)

This invention relates to means for securing machine parts adjustably in relation to each other and/or to a driving or driven element, without the use of keys, pins, screws, or any of the usual means.

The principal object of the invention is to provide a method of securing two or more machine parts together without the use of any of the usual devices, such as keys, pins, set screws, etc.

A specific object of the invention is to form the interior periphery of an element, which is to be secured to a second element, in the form of a special spiral curve which coacts with the outer periphery of the second element, said spiral curves being developed, or constructed, to produce a gripping and wrapping effect when secured together.

Another object of the invention is to form two elements to be secured together in such a way that the elements are concentric at all times regardless of how tightly they are twisted, or wrapped, together.

A further object of the invention is to provide a scale on one of two elements which are fast together, to provide a simple and efficient means for assisting in locating the elements relatively to each other before the two elements are secured together.

A specific object of the invention is to develop spiral peripheries on elements, which spirals have a fixed rate of expansion per degree of curvature, and which are developed by drawing an inner circle, the radius of which touches the innermost point of the spiral, and an outer circle which touches the outermost point of the spiral, and then dividing the circles into a plurality of equal spaces, and then progressively bisecting each line at a point equal to the rise of the spiral divided by the number of spaces, then projecting the spiral through the bisecting points.

Another specific object of the invention is to provide an adjustable pulley of the V-type which can be quickly adjusted to change the effective pitch diameter of the pulley, or to change the pulley to accommodate belts of various widths, without the use of pins, keys, etc., and at the same time provide a pulley which is fixed in its adjustment once the desired adjustment is achieved.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

General description

Described in general terms, the invention consists in providing a novel means for securing two elements relatively to each other without the use of a third element, such as keys, pins, set screws, etc. The particular use in which the invention is advantageous is when two elements are to be secured together, yet be easily adjusted relatively to each other. Ordinarily, when an element is to be secured to a shaft, it is necessary to use dowel pins, keys, set screws, etc., which make the elements substantially fixed in their locations and do not provide for easy changing of their locations relatively to each other.

Figure 5:
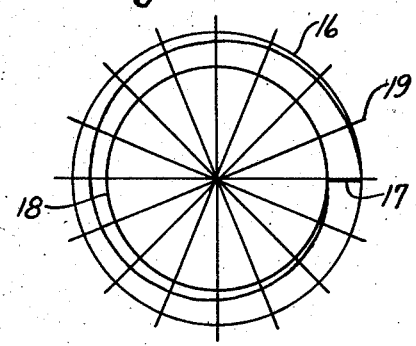
Fig. 5 is a diagram showing how the spirals on the two elements are developed.

The invention not only provides for easy adjustment, but also provides a highly efficient method of fastening the elements together. In obtaining this efficient securing of the elements together, they are provided with complementary spirals of a definite form. The outer periphery of the male element is formed of a spiral developed at a fixed rate of expansion per degree of curvature, as illustrated in Fig. 5. The inner periphery of the female member is likewise formed. The male member is also provided with a slit between the low and high points of the spiral so as to make the male member slightly resilient. This slit is not essential, but in certain applications of the invention it serves a useful purpose. By inserting the male member into the female member and locating the elements relatively to each other at the desired distance, and turning the members relatively to each other, the result is a gripping and wrapping effect to secure them tightly together. By the use of the spiral, as shown in Fig. 5, the spiral peripheries contact each other at all points and also maintain the members concentric at all times, regardless of how tightly they are twisted together.

*Detailed description*

Figure 1:
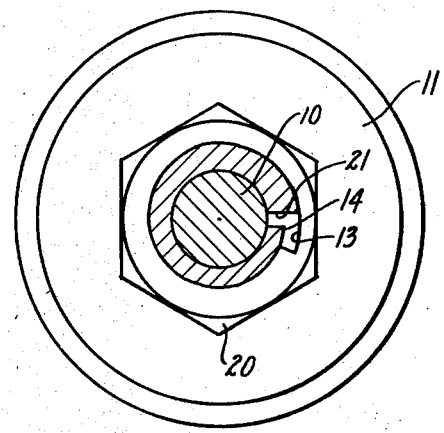
Fig. 1 is a side elevation showing one application of the invention, and illustrates an adjustable pulley of the V-type.
Figure 2:
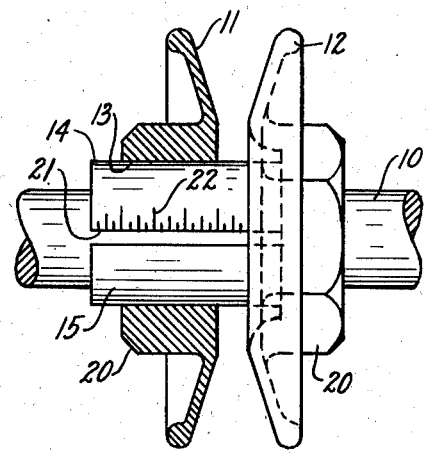
Fig. 2 is a cross sectional view of the pulley shown in Fig. 1.
Figure 3:
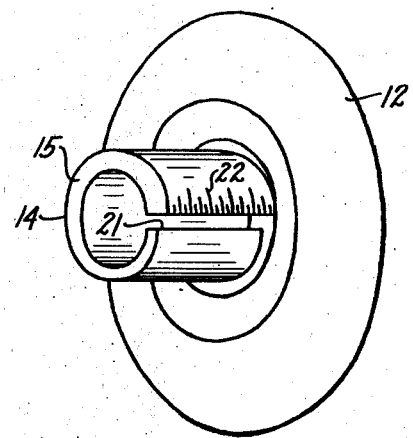
Fig. 3 is a perspective view of one element of the pulley shown in Figs. 1 and 2.

As illustrated in Figs. 1, 2, and 3, the invention is shown applied to an adjustable pulley of the V type where it is desired to provide a quick means for adjusting the pulley for obtaining different effective pitch diameters of the pulley. The pulley can also be adjusted to receive varying width belts. The pulley is shown mounted on a shaft 10, and consists of flanges 11 and 12. The opening 13 of the flange 11, and the periphery 14 of an extension or hub 15, are formed in the shape of a spiral illustrated in Fig. 5. As illustrated in Fig. 5, the spiral is developed by drawing a circle 16 through the outer point of the rise 17, and a circle 18 through the inner point of the rise 17, then dividing the circles into a plurality of equal spaces, then dividing the rise 17 into the same number of equal spaces and projecting the division points onto the dividing lines 19, and finally developing a curve through the points bisecting the lines 19. Such a spiral can be developed by standard machine tools. A hexagon head 20 can be provided, if desired, to assist in twisting the flanges together. A slot 21 is provided in the hub 15, so that the hub 15 can spring slightly and grip the shaft 10 tightly when assembled on the shaft 10.

Graduations 22 are provided on the hub 15 to assist in accurately locating the flanges 11 and 12 relatively to each other. These graduations may be marked, numbered, or indexed as required.

In assembling the pulley to the shaft 10, the flange 12 having the spiral-formed hub 15 is slipped into position. Then the flange 11 having the spiral-shaped bore is positioned on the hub 15, the graduations 22 assisting in locating the flange 11 relatively to the flange 12. Thereafter a wrench can be applied to the hexagon heads 20 and the flange 11 twisted onto the hub 15, which in turn grips the shaft 10. The particular form of spiral illustrated in Fig. 5 is such that the periphery 13 contacts the periphery 14 at all points from one end of the spiral to the other, thus providing a tight and efficient means for assembling the pulley parts to the shaft. Also the spiral is of such form that the flanges 11 and 12 of the pulley are concentric at all times, no matter how tightly the flanges are twisted together. This latter feature is important because it is imperative that the two flanges be always concentric.

Figure 4:
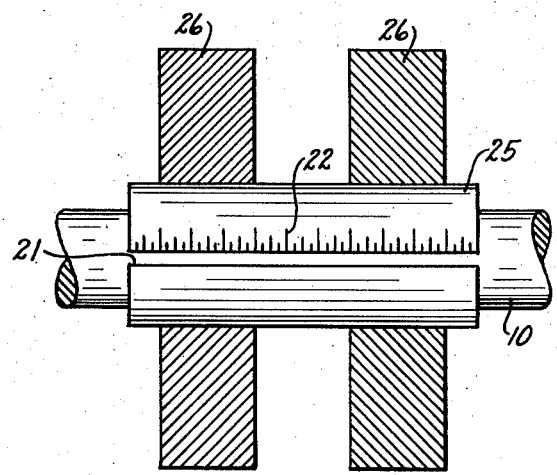
Fig. 4 is another illustration of an application of my invention.

The particular development of the spiral (Fig. 5) is also of the utmost importance when assembling elements other than pulleys. For example, any two or more parts can be assembled on a shaft, as shown in Fig. 4. In this adaptation, a sleeve 25 is used and as many parts 26 as desired, of any desired form or function, can be assembled thereon, and, by simply twisting the part on the sleeve 25, can be securely assembled to the shaft.

The sleeve 25 is formed like hub 15 and has graduations 22 to assist in locating the parts relatively to each other. It can also be provided with a slit 21 if desired. This slit is shown running at right angles to the pulley flanges, but the slit can be run at an angle, or even in spiral form around the hub 15, to accomplish the same purpose.

In the use of the invention in connection with pulleys of the V-type, the novel invention provides a means of securing the pulley parts together so that the pulley can be rotated as a unit in either direction, without any tendency of the two parts to become detached from each other. This is due to the fact that the V-belt drives both halves of the pulley in the same direction, and in order to separate the two halves it is necessary to rotate them relatively to each other. Since the belt rotates them both in the same direction, they will not become separated in use.

The plurality of parts 26 may be pulleys, gears, milling cutters, cams, or any conceivable machine parts that are to be assembled onto a shaft or sleeve.

Fig. 5 is a diagram showing how the spiral mentioned above is developed. An inner circle is drawn of such a radius that it will just touch the innermost point of the spiral. An outer circle is drawn so that it will touch the outermost point of the spiral. These circles are then divided into any number of equal parts and the radiating lines drawn through as shown. Now the true rise of the spiral in one complete turn will be one-half of the difference of the diameters of the two circles. This rise is then divided into the same number of parts that the circles were divided into. In the diagram illustrated, the circles have been divided into 16 parts. Therefore, in this case, one-sixteenth of the true rise of the spiral is the amount that the spiral curve advances from the center of the circles for each division of the circles.

A spiral of this type can be more accurately defined by saying that it has a fixed rate of expansion per degree of curvature. Such spirals can be readily developed by existing standard machinery. This type of spiral is important in my invention because it produces an even and equal pressure around the circumference of the slotted sleeve, thus producing a combination gripping and wrapping effect on the central shaft. Furthermore, a spiral of this nature maintains the parts concentric at all times, regardless of how tightly they are twisted together.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a V-type pulley of the class described, the combination of a pair of elements adjustable relatively to each other; an extension on one of said elements having its periphery formed in the shape of a spiral developed at a fixed rate of expansion per degree of curvature, said other element having a bore formed with a like spiral, said bore and spiral adapted, when one element is rotated on the extension of the other, to secure the elements tightly in relation to each other; graduations on said extension to assist in locating the elements relatively to each other; and a V-belt coacting with both elements to rotate them as a unit in either direction.

2. In a device of the class described, the combination of a plurality of pulley elements adjustable relatively to each other; means on one element having its periphery formed in the shape of a spiral developed at a fixed rate of expansion per degree of curvature; a slot in said means running in a direction at right angles to each of said elements; a bore in one of said elements formed like said spiral, the bore and spiral coacting to secure the elements together by wrapping and twisting movements, said slot providing a slight resiliency to permit the wrapping and twisting movements; and a scale on said means to assist in locating the elements relatively to each other.

3. In a V-type pulley of the class described, the combination of a plurality of elements adjustable relatively to each other; means on one of said elements having its periphery formed in the shape of a spiral developed at a fixed rate of expansion per degree of curvature, one of said elements having a bore formed with a like spiral, said bore and spiral adapted, when one element is rotated on the other, to secure the elements tightly in relation to each other; and a V-belt coacting with both elements to rotate them in one direction and reverse.

4. In a device of the class described, the combination of two elements adjustable relatively to each other; means integral with one of said elements and having its periphery formed in the shape of a spiral developed at a fixed rate of expansion per degree of curvature; a slot in said means extending between said elements; and a bore in one of said two elements formed like said spiral, the bore and spiral coacting to secure the two elements together by wrapping and twisting movements, said slot providing a slight resiliency to permit the wrapping and twisting movements.

5. In a device of the class described, the combination of a two-part pulley of the V-type; a hub on one part of the pulley formed in the shape of a spiral developed at a fixed rate of expansion per degree of curvature; a bore in the other part formed like said spiral and of the same dimensions to receive said spiral; a slot in the hub; and means whereby the two parts of the pulley may be turned relatively to each other, after the spiral hub has been inserted into the bore, to thereby wrap the two-part pulley securely together to form a unitary pulley.

6. In an adjustable two-part pulley of the V-type, an extension on one part formed in the shape of a spiral having a uniform rate of expansion per degree of curvature; and a bore in the other part of the pulley of the same shape and size as the spiral and adapted to be assembled on the spiral at any location to accommodate different width V belts, said other part thereupon being rotatable on the spiral to secure the two parts together to form a pulley to accommodate the desired width belt.

7. In a device of the class described, the combination of a two-part pulley of the V-type; a hub on one part of the pulley formed in the shape of a spiral developed at a fixed rate of expansion per degree of curvature; a bore in the other part formed like said spiral and of the same dimensions to receive said spiral; a slot in the hub; means whereby the two parts of the pulley may be turned relatively to each other, after the spiral hub has been inserted into the bore, to thereby wrap the two-part pulley securely together to form a unitary pulley; and a scale on the spiral to determine the distance between the two parts of the pulley.

8. In an adjustable two-part pulley of the V-type, an extension on one part formed in the shape of a spiral having a uniform rate of expansion per degree of curvature; a bore in the other part of the pulley of the same shape and size as the spiral and adapted to be assembled on the spiral at any location to accommodate V belts at various effective pitch diameters, said other part thereupon being rotatable on the spiral to secure the two parts together to form a pulley to accommodate the belt at the desired effective pitch diameter; and graduations marked on the spiral and visible between the two parts of the pulley to aid in adjusting the two parts of the pulley.

WALLACE C. HERMAN.